(12) United States Patent
Kelly et al.

(10) Patent No.: US 6,806,677 B2
(45) Date of Patent: Oct. 19, 2004

(54) AUTOMATIC CONTROL SWITCH FOR AN ELECTRIC MOTOR

(75) Inventors: Gerard Kelly, 2412 Ventura Drive, Oakville, Ontario (CA), L6L 2H4; Bernard Forrester, Pentanguishene (CA)

(73) Assignee: Gerard Kelly, Ontario (CA)

( * ) Notice: Subject to any disclaimer, the term of this patent is extended or adjusted under 35 U.S.C. 154(b) by 111 days.

(21) Appl. No.: 10/269,641

(22) Filed: Oct. 11, 2002

(65) Prior Publication Data

US 2004/0070357 A1 Apr. 15, 2004

(51) Int. Cl.[7] .................................................. H02P 1/26
(52) U.S. Cl. ...................... 318/767; 318/772; 318/779; 318/782; 318/790; 417/44.1
(58) Field of Search ................................ 318/767, 772, 318/779, 782, 790; 417/44.1

(56) References Cited

U.S. PATENT DOCUMENTS

| 5,049,801 | A | | 9/1991 | Potter | |
|---|---|---|---|---|---|
| 5,457,373 | A | * | 10/1995 | Heppe et al. | 318/772 |
| 5,465,589 | A | * | 11/1995 | Bender et al. | 62/133 |
| 5,692,676 | A | * | 12/1997 | Walker | 237/8 R |
| 5,701,750 | A | * | 12/1997 | Ray | 62/160 |
| 5,725,359 | A | * | 3/1998 | Dongo et al. | 417/44.9 |
| 6,228,272 | B1 | * | 5/2001 | Gola | 210/742 |

* cited by examiner

Primary Examiner—Rina Duda
(74) Attorney, Agent, or Firm—Alston & Bird LLP

(57) ABSTRACT

A simple and economical mechanism providing automatic motor control. The mechanism includes a motor-rated relay directly connected to line voltage and the input terminal of a motor winding, and receiving a signal from a sensing device connected to line voltage and to a signal input on the relay. The relay and sensing device may be housed within a waterproof enclosure, or may be separately housed within a connection enclosure and a separate sensing device enclosure remote from the connection enclosure, the two enclosures being connected by a cable. The sensing device triggers the relay to control the supply of current to the motor winding.

14 Claims, 4 Drawing Sheets

AUTOMATIC CONTROL SWITCH FOR AN ELECTRIC MOTOR

FIELD OF INVENTION

The present invention relates to motor control, and specifically to an automatic control switch for an electric motor.

BACKGROUND OF THE INVENTION

Electric motors are often employed in situations where they are run semi-continuously, such as during daylight hours only. In other situations, a two-speed motor may be run at one speed during the day and at a lower speed at night. For example, in the context of an outdoor pool, the pool pump employs a fractional horsepower AC motor. The pool pump is typically run at high-speed during the day since the pool is in use during the day and incident sunlight upon the water encourages algae formation within the pool. It is less important to operate the pool during the night. Accordingly, it may be desirable to run the pump at low speed or not at all during the night so as to conserve energy and prolong the life of the motor.

There are other circumstances in which it is desirable to automatically control the operation of a motor based upon external environmental criteria. These criteria may include temperature, fluid level, pressure, or other measurable parameters.

A conventional approach to motor control has been to employ mechanical timers. A drawback of mechanical systems for switching a motor on an off is the fallibility of moving components and the extra cost and complexity associated with such systems. A timer approach also relies upon a user to set an appropriate time using the mechanical device. Other approaches to motor control have met with limited success, but are often excessively complex.

Another drawback to known systems that incorporate a motor controller having a daylight sensor is that the pool motor is often housed within a pool shed rendering it impracticable to sense daylight at the motor location.

SUMMARY OF THE INVENTION

The present invention provides a simple and economical mechanism providing automatic motor control.

In one aspect, the present invention provides an enclosure that houses a sensing device and motor-rated relay. The motor-rated relay is directly connected to line voltage and directly connected to input terminals for powering the motor. The relay is also connected to the sensing device for receiving a signal that triggers the relay to turn on or off.

In another aspect, the present invention provides a mechanism that includes a connection enclosure and a separate sensing device enclosure, the two enclosures being connected by a cable. The connection enclosure includes a motor-rated relay for direct connection to input line voltage and directly connected to input terminals for powering the motor. The relay is also directly connected to the cable for receiving a signal from a sensing device located within the sensing enclosure.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Reference will now be made, by way of example, to the accompanying drawings which show an embodiment of the present invention, and in which.

DETAILED DESCRIPTION OF AN EMBODIMENT

The present invention provides a motor control system for automatically controlling the operation of an electric motor. The present invention is adaptable for use in controlling a pool motor for switching between day and night use based upon the sensed light intensity level.

Figure 1:
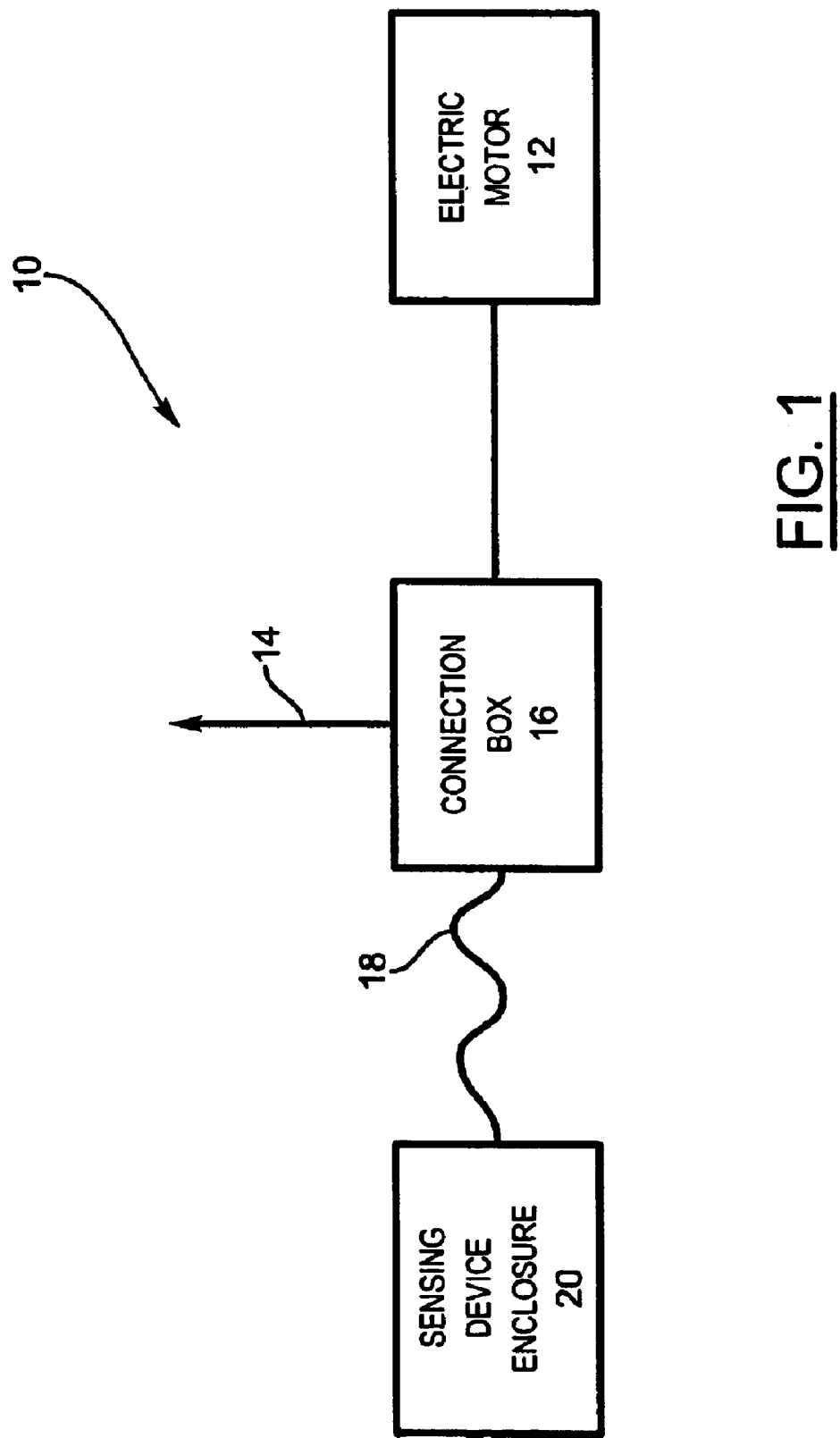
FIG. 1 shows in diagrammatic form a motor control system according to the present invention.

Reference is first made to FIG. 1, which shows, in diagrammatic form, an embodiment of a motor control system 10 according to the present invention. The system 10 includes an electric motor 12 and a power supply line 14. The motor 12 may be a fractional horsepower single speed motor, although it may include higher horsepower motors or multiple speed motors. The power supply line 14 is coupled to the motor 12 through a connection box 16. In this embodiment, the connection box 16 is an enclosure coupled to a sensing device enclosure 20 through a cable 18. The cable 18 is sufficiently lengthy to allow the sensing device enclosure 20 be placed at a location remote from the connection box 16 and/or the motor 12. This ensures that the sensing device enclosure 20 is not affected by the environment of the connection box 16 and/or the motor 12. In one embodiment, the cable 18 is at least two meters long. The connection box 16 may be mounted to the outer casing of the motor 12. Both the connection box 16 and the sensing device enclosure 20 are waterproof.

Figure 2:
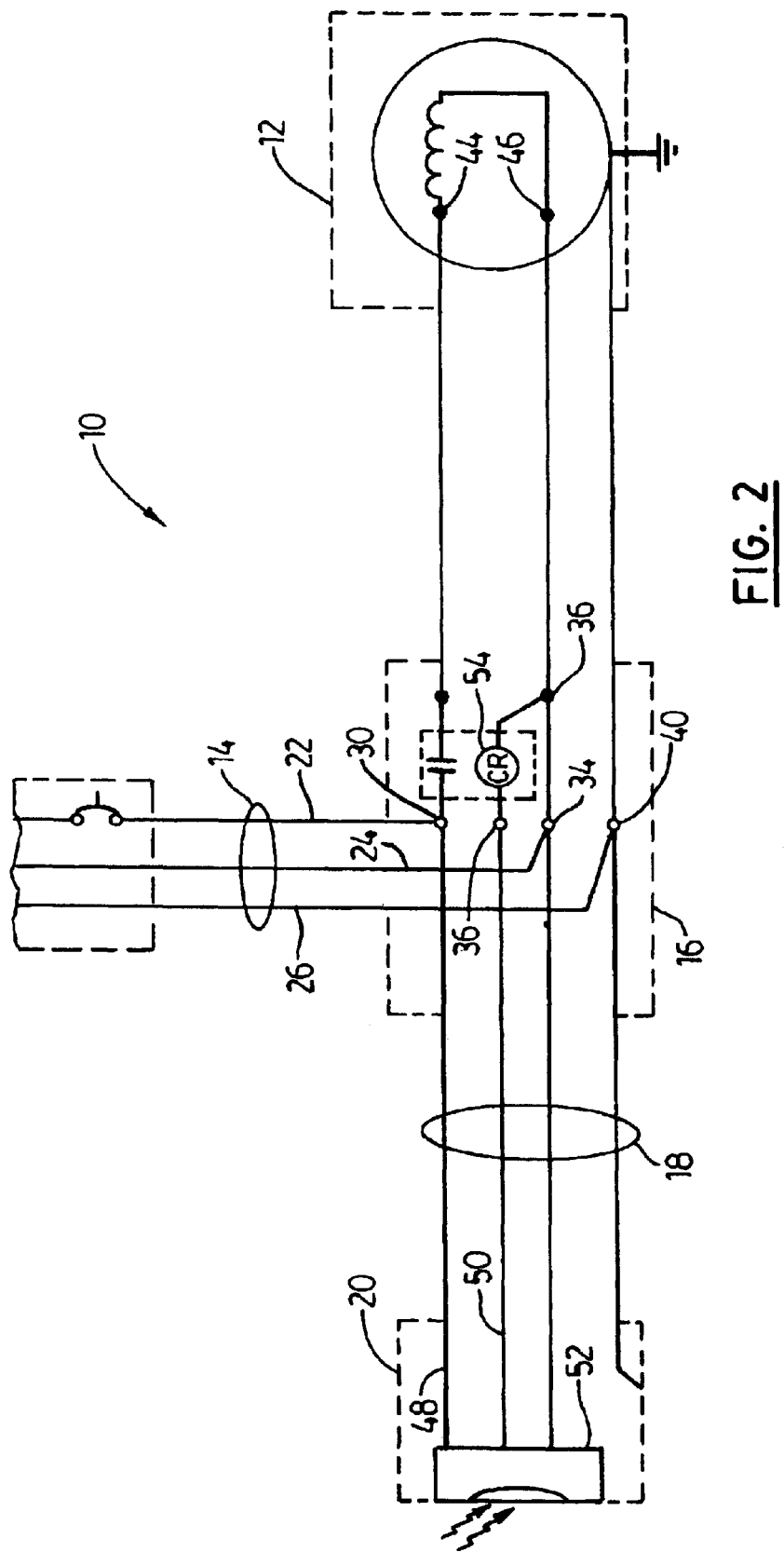
FIG. 2 shows a wiring configuration for a photoelectric-based single-speed motor control system according to the present invention.

Reference is now made to FIG. 2, which shows the wiring configuration of the system 10 according to the present invention. The power supply line 14 includes at least three conductors, including a line voltage wire 22, a neutral wire 24 and a ground wire 26. The power supply line 14 terminates within the connection box 16 at a set of terminals. In particular, the line voltage wire 22 terminates at a line voltage input terminal 30 and the neutral wire 24 terminates at a neutral input terminal 34. The ground wire 26 terminates at a grounded terminal 40. The connection box 16 may be made of a conductive material, such as aluminum or stainless steel, in which case the grounded terminal 40 is connected to the connection box casing so as to ground the casing. The terminals within the connection box 14 also include a line voltage output terminal 32 and a neutral output terminal 36.

The electric motor 12 includes a motor winding with a winding input terminal 44 and a winding output terminal 46 for supplying current to power the motor 12. The line voltage output terminal 32 and the neutral output terminal 36 are electrically connected to the winding input terminal 44 and winding output terminal 46, respectively. The grounded terminal 40 is electrically connected to grounded components of the motor 12, such as the motor casing.

The connections between the terminals of the connection box 16 and the motor 12 may be effected using a three-conductor cable directly connected to the various terminals. The connection box 16 may be integrally formed with the motor casing, may be mounted externally upon the motor casing or may be remote from the motor casing.

The connection box 16 further includes a motor-rated relay 54. In one embodiment, the terminals 30, 32, 34, 36, 40 are integral to the relay. A relay 54 which may be suitably modified for this purpose is the motor-rated power relay model G4B-112TP-FD-C-US-RP manufactured by Omron Electronics, Inc. of Schaumburg, Ill. This commercially available relay is normally intended for use in printed circuit board applications, but may be modified for mounting within the connection box 16. In one embodiment, the top is removed from the commercially available relay 54 in order to directly access the terminals and solder connections to the relay 54.

The relay 54 is used so as to open or close the connection between the line voltage input terminal 30 and the line voltage output terminal 32 in response to a signal from a sensing device 52. A signal at a sensor terminal 38 energizes the relay 54 so as to close (or open, depending upon whether the contacts are normally open or normally closed) the connection between the voltage terminals 30 and 32. Of course, it will be understood by those of ordinary skill in the art that, despite describing the operation of the relay 54 in terms of opening and closing contacts, there are no moving parts or mechanical contacts in the motor-rated power relay 54 as compared to, for example, a solenoid. In one embodiment, the relay 54 has a positive input terminal and a negative input terminal, and the positive input terminal is the sensor terminal 38 and the negative input terminal is the neutral input and output terminals 34 and 36.

The cable 18 contains at least three conductors connecting various terminals of the connection box 14 to a sensing device 52 housed within the sensing device enclosure 20. In one embodiment, the cable 18 includes a live conductor 48 directly connected to the line voltage input terminal 30 at one end and to the input of the sensing device 52 at the other end. The cable 18 also includes a signal conductor 50 directly connected to the output of the sensing device 52 at one end and to the sensor terminal 38 at its other end. The cable 18 also includes a ground wire connecting the sensing device enclosure 20 to the grounded terminal 40. The signal conductor 50 provides a signal to the relay 54 to cause it to open or close its contacts under the control of the sensing device 52.

The operative input to the relay 54 is coupled between a sensor terminal 38 and the neutral line 24. In one embodiment, the sensing device 52 is a photodetector that responds to an incident light intensity above a predetermined threshold by conducting current from the live conductor 48 to the signal conductor 50, which triggers the relay 54 to open or close the contacts (as the case may be) thereby permitting or preventing current from flowing in the motor 12. In this manner, the photodetector controls the operation of the motor 12 based upon the environmental light intensity.

In one embodiment, the sensing device 52 is a photodetector having a threshold that senses the transition in light intensity between night and day so as to switch the motor on during the day and off during the night. When applied in the circumstances of a pool motor, the system 10 ensures that the pool motor runs during the day and not during the night, when it is not needed. The sensing device 52 may be provided with an integral delay to prevent rapid switching due to a temporary drop in the light intensity level, such as when a person or object briefly obstructs the photodetector.

Figure 3:
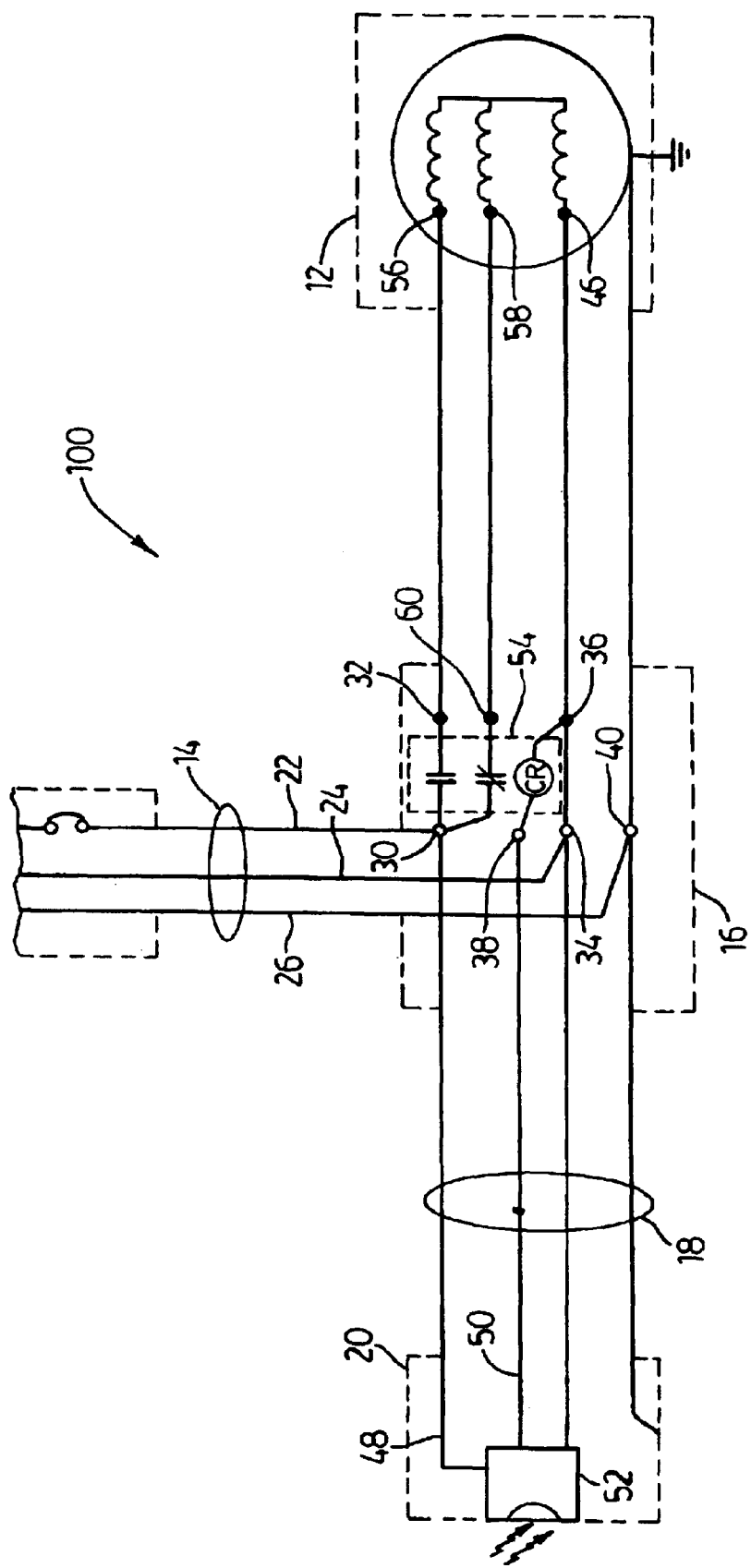
FIG. 3 shows a wiring configuration for a photoelectric-based double-speed motor control system according to the present invention.

Reference is now made to FIG. 3, which shows the wiring configuration of a two-speed motor control system 100 according to the present invention. The motor 12 depicted in FIG. 3 features both a high-speed winding and a low-speed winding. The high-speed winding is coupled between a high-speed winding input terminal 56 and the winding output terminal 46. The low-speed winding is coupled between a low-speed winding input terminal 58 and the winding output terminal 46. The terminals within the connection box 16 further include a low-speed output voltage terminal 60 for connection to the low-speed winding input terminal 58.

The relay 54 provides a normally closed connection between the line voltage input terminal 30 and the low-speed output voltage terminal 60, so that the motor operates a low speed in the normal course. The normally open connection is made between the line voltage input terminal 30 and the line voltage output terminal 32. As described above, the relay 54 is triggered by the sensing device 52 to open and close the contacts. When the sensing device 52 is a photodetector, the sensing device 52 signals the relay 54 when the light intensity exceeds a predetermined threshold, causing the relay 54 to open the normally closed contacts and close the normally open contacts, thereby providing current to the high-speed winding of the motor. The system 100 may be employed to operate a pool motor 12 at high-speed during the daylight hours and at low-speed during the night.

The sensing device 52 is not limited to a photodetector, and may include any sensing device 52 operable to trigger the relay 54 in response to a stimulus. Other sensing devices 52 may include a temperature sensor, an air-pressure switch, a fluid-level switch, and a manually operated switch. Other possible sensing devices 52 will be understood by those of ordinary skill in the art.

Figure 4:
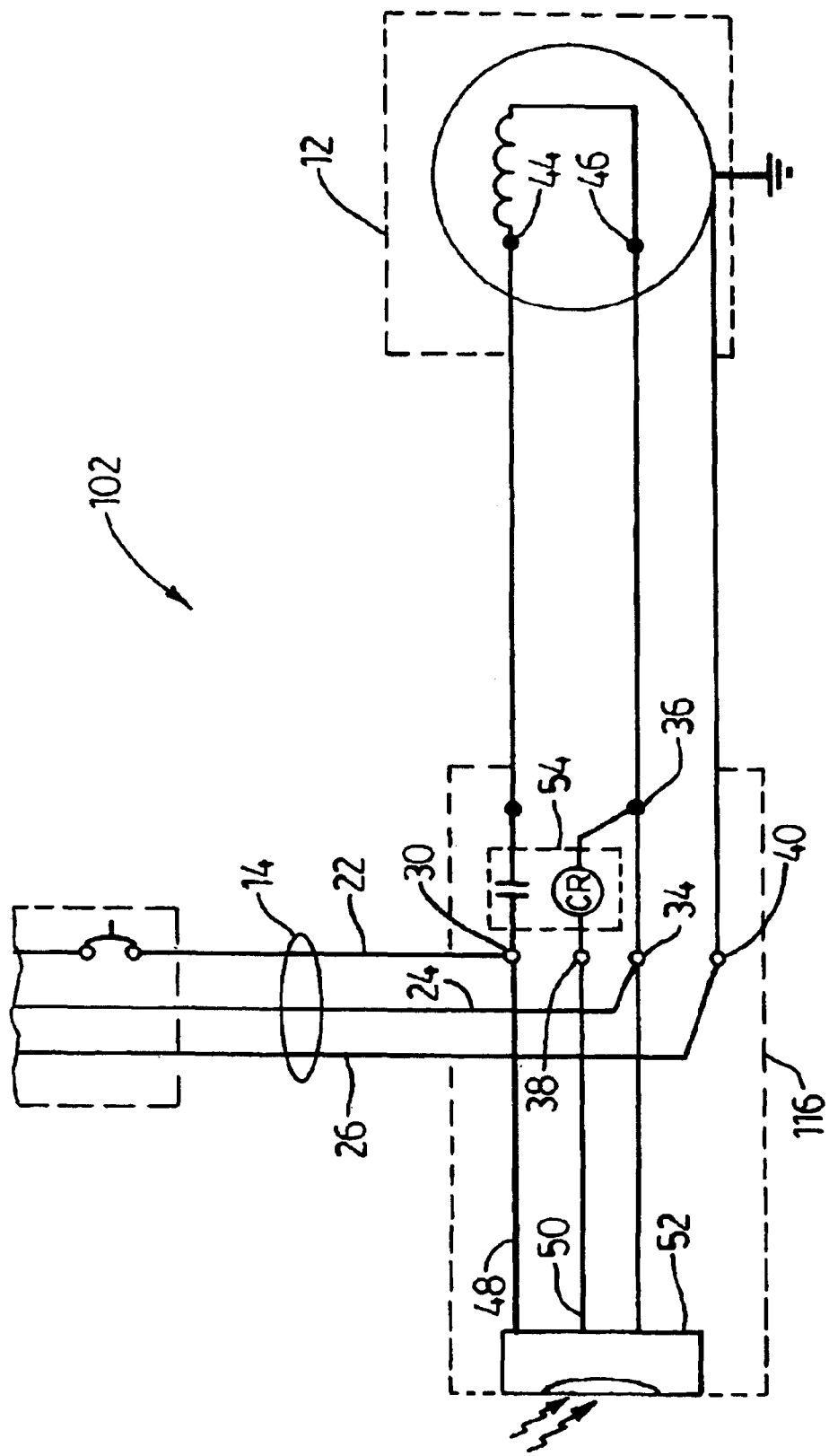
FIG. 4 shows a wiring configuration for a further photoelectric-based single-speed motor control system according to the present invention.

Reference is now made to FIG. 4, which shows a further embodiment of a single-enclosure system 102 according to the present invention. In some circumstances, it is not necessary to place the sensing device 52 at a location remote from the motor 12 and/or the connection box 16. Accordingly, a single enclosure 116 houses the relay 54 and the sensing device 52. No external cable 18 (FIG. 2) is required to connect the relay 54 to the sensing device 52, although the live conductor 48 and the signal conductor 50 are still employed to connect the voltage input terminal 30 and the sensor terminal 38, respectively, to the sensing device 52.

The enclosure 116 may be mounted to the motor 12 casing, or may be located remote from the motor 12 casing. If mounted to the motor 12 casing, the enclosure 116 is preferably placed on or near the top side of the casing to improve accessibility and expose the sensing device 52 to the environment, when the sensing device 52 is a photosensor.

The present invention may be embodied in other specific forms without departing from the spirit or essential characteristics thereof. Certain adaptations and modifications of the invention will be obvious to those skilled in the art. Therefore, the above-discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A control mechanism for an electric motor, the motor including a motor winding and having a motor input terminal coupled to one end of the winding for supplying current to the winding and a motor output terminal coupled to the other end of the winding, the mechanism comprising:

a motor-rated relay, the relay having a signal input terminal for receiving an input signal, a neutral terminal, a voltage input terminal for connection to line voltage, and a voltage output terminal connected to the motor input terminal, the voltage input terminal being selectively connected to the voltage output terminal in response to the input signal; and a sensing device having a sensor input terminal and a sensor output terminal, the sensor input terminal being directly connected to the voltage input terminal and the sensor output terminal being directly connected to the signal input terminal.

2. The control mechanism claimed in claim 1, wherein said sensing device is selected from the group comprising a photosensor, a fluid-level switch, an air-pressure switch, a temperature sensor and a manually-operated switch.

3. The control mechanism claimed in claim 1, wherein said relay and said sensing device are housed within a waterproof enclosure.

4. The control mechanism claimed in claim 1, wherein said motor-rated relay is housed within a connection enclosure and said sensing device is housed within a sensing enclosure remote from the connection enclosure, the mechanism further including:

a cable having one end located within the connection enclosure and the other end located within the sensing enclosure, said cable including a first conductor, a second conductor and a ground wire, said first conductor having one end directly connected to the voltage input terminal and the other end directly connected to the sensor input terminal, and said second conductor having one end directly connected to the signal input terminal and the other end directly connected to the sensor output terminal.

5. The control mechanism claimed in claim 4, wherein said cable is at least two meters in length.

6. The control mechanism claimed in claim 1, wherein said motor is a single speed motor.

7. The control mechanism claimed in claim 1, wherein said motor is a two-speed motor having a high-speed winding and a low-speed winding, and wherein said motor input terminal includes a high-speed input terminal and a low-speed input terminal, and wherein the relay includes a high-speed voltage output terminal and a low-speed voltage output terminal, said low-speed voltage output terminal being selectively disconnected from said voltage input terminal and said high-speed voltage output terminal being selectively connected to said voltage input terminal in response to the input signal.

8. A pump for a pool having an automatic control system, comprising:

a pump;

a fractional horsepower electric motor operatively coupled to the pump for providing energy to the pump, the motor including a motor winding and having a motor input terminal coupled to one end of the winding for supplying current to the winding and a motor output terminal coupled to the other end of the winding;

a motor-rated relay, the relay having a signal input terminal for receiving an input signal, a neutral terminal, a voltage input terminal for connection to line voltage, and a voltage output terminal connected to the motor input terminal, the voltage input terminal being selectively connected to the voltage output terminal in response to the input signal; and a sensing device having a sensor input terminal and a sensor output terminal, the sensor input terminal being directly connected to the voltage input terminal and the sensor output terminal being directly connected to the signal input terminal.

9. The pool pump claimed in claim 8, wherein said sensing device is selected from the group comprising a photosensor, a fluid-level switch, an air-pressure switch, a temperature sensor and a manually-operated switch.

10. The pool pump claimed in claim 8, wherein said relay and said sensing device are housed within a waterproof enclosure.

11. The pool pump claimed in claim 8, wherein said motor-rated relay is housed within a connection enclosure and said sensing device is housed within a sensing enclosure remote from the connection enclosure, the mechanism further including:

a cable having one end located within the connection enclosure and the other end located within the sensing enclosure, said cable including a first conductor, a second conductor and a ground wire, said first conductor having one end directly connected to the voltage input terminal and the other end directly connected to the sensor input terminal, and said second conductor having one end directly connected to the signal input terminal and the other end directly connected to the sensor output terminal.

12. The pool pump claimed in claim 11, wherein said cable is at least two meters in length.

13. The pool pump claimed in claim 8, wherein said motor is a single speed motor.

14. The pool pump claimed in claim 8, wherein said motor is a two-speed motor having a high-speed winding and a low-speed winding, and wherein said motor input terminal includes a high-speed input terminal and a low-speed input terminal, and wherein the relay includes a high-speed voltage output terminal and a low-speed voltage output terminal, said low-speed voltage output terminal being selectively disconnected from said voltage input terminal and said high-speed voltage output terminal being selectively connected to said voltage input terminal in response to the input signal.

* * * * *